United States Patent Office 2,864,712
Patented Dec. 16, 1958

2,864,712

HIGH VOLTAGE CERAMIC DIELECTRIC

Alvin L. Rogatz, Oak Park, Ill., assignor to Zenith Radio Corporation, a corporation of Delaware No Drawing. Application July 29, 1955
Serial No. 525,379

2 Claims. (Cl. 106—39)

This invention relates to vitrified ceramic materials and more particularly to ceramic condenser dielectrics which provide high capacity, miniature capacitors capable of withstanding high applied potentials.

In television receivers it is common to pulse line-deflection voltages of the order of 5,000 volts through the line-deflection coils. It is necessary to employ several capacitors in the line-deflection output circuit, and it is desirable that these capacitors be as small as possible while simultaneously exhibiting good voltage breakdown characteristics. There are other applications for high voltage, high capacity condensers which nevertheless must be of small physical size, in power supplies and in many types of test equipment.

It is an object of the invention to provide a new and improved condenser dielectric exhibiting a high voltage-per-unit-thickness breakdown strength.

The improved condenser dielectric of the present invention consists essentially of titanium dioxide in an amount from 60 to 95 percent by weight, and the balance strontium zirconate. When fired to vitrification, a dielectric constant of the order of 100 with breakdown strengths as high as 500 volts per mil are achieved.

The features of the invention which are believed to be novel are set forth with particularity in the appended claims. The invention, together with further objects and advantages thereof, may more readily be understood by reference to the following description.

The present invention provides a vitrified ceramic material which consists essentially of titanium dioxide and strontium zirconate. The ceramic piece which results from the combination of the titanium dioxide and stronium zirconate exhibits a dielectric constant sufficiently high to permit the construction of a high capacity condenser with physically small dimensions. The voltage breakdown strength per unit thickness of the resultant material is high, which renders this material suitable, even in miniature sizes, for high voltage applications. A capacitor of this type finds utility in many high voltage applications, such as the line-deflection output circuits of a television receiver. For purposes of illustration and in no sense by way of limitation the following process may be employed to produce a vitrified ceramic piece which is suitable for use as such a capacitor.

The principal ingredients in finely powdered form, which, in a preferred embodiment, consist essentially of titanium dioxide in the amount of 90% by weight and strontium zirconate in the amount 10% by weight, are thoroughly mixed together. Small amounts of a suitable flux and binder may be added to the principal ingredients, as is well known in the art. Any of the transition metal oxides such as iron, cobalt, or nickel oxide may be used as a flux, and the binder may be an organic material, as for example, polyvinyl alcohol. The resultant material is thoroughly mixed and then dried; the material is then granulated. Next, the mixture is pressed into the desired shape in a suitable mold and then fired to vitrification, as for example at a temperature of 2300 degrees Farenheit for 90 minutes.

The pressing, molding, and firing steps are entirely conventional and are well known in the art. Reference is made, for example, to an article entitled "Factors Affecting the Ceramic and Electrical Properties of High Dielectric Constant of Titanates," appearing in "Ceramic Age," page 188, April 1949; in the second paragraph of the article, the typical process is set forth to include pressing at 10,000 p. s. i. and firing to a peak temperature in a "Globar" furnace over a period of 3 to 3½ hours, then holding for 2 hours, followed by furnace cooling overnight. As stated previously, the disclosed embodiment of the present invention calls for firing to a peak temperature of 2300° F. and holding it at that temperature for 90 minutes.

As the amount of strontium zirconate in the mixture is varied, the dielectric constant of the resultant ceramic piece is likewise varied. As the amount of strontium ziroconate in the original mixture varies from 5 to 40 percent, the dielectric constant of the resultant ceramic piece varies from 90 to 110, somewhat above the dielectric constant of titanium dioxide. As the proportion of stronium zirconate is increased beyond 40 percent, the dielectric constant of the resultant piece drops off. The voltage breakdown strength is approximately 400 volts per mil or higher for mixtures including strontium zirconate in amounts from 5 to 40 percent.

When the original mixture contains less than five percent of stronium zirconate, the piece exhibits properties substantially similar to those of titanium dioxide alone. If amounts of strontium zirconate greater than 40 percent by weight are used, the dielectric constant falls off, requiring a thinner piece for a given capacitance; additionally, firing is irregular and unpredictable for such mixtures.

In a preferred embodiment, a piece resulting from a mixture containing 90 percent titanium dioxide and the remainder strontium zirconate gives high voltage breakdown strengths, more than 400 volts per mil, and has a dielectric constant of approximately 100. Such pieces have a temperature coefficient of capacity of about 1,000 parts per million negative, and a "Q" greater than 1,000 at a frequency of one megacycle. A piece fired from a mixture containing the preferred proportions is eminently suited for high voltage, miniature condenser applications.

While a particular process for preparing the condenser dielectric of the present invention has been set forth, it is to be understood that this process is merely illustrative. Certain departures from the procedure set forth may be made with no substantial effect on the properties of the resulting ceramic material. It is also to be noted that certain variations in the individual steps in the process may be required when it is desired to produce pieces of specific size and shape; such variations will occur to those skilled in the art.

The use of the phrase "consisting essentially of" in the appended claims is not intended to exclude small amounts of impurities or of flux materials in an amount of the order of 3 percent by weight or less; impurities, in varying amounts, are always present, and the use of various fluxes is well known and understood.

I claim:

1. A ceramic dielectric material consisting essentially of titanium dioxide in an amount of from 60 percent to 95 percent by weight and the balance strontium zirconate.

2. A ceramic dielectric material consisting essentially of substantially 90 percent titanium dioxide by weight and the balance strontium zirconate.

References Cited in the file of this patent

UNITED STATES PATENTS 2,402,517    Wainer                June 18, 1946
2,541,140    Woodcock et al.      Feb. 13, 1951